UNITED STATES PATENT OFFICE.

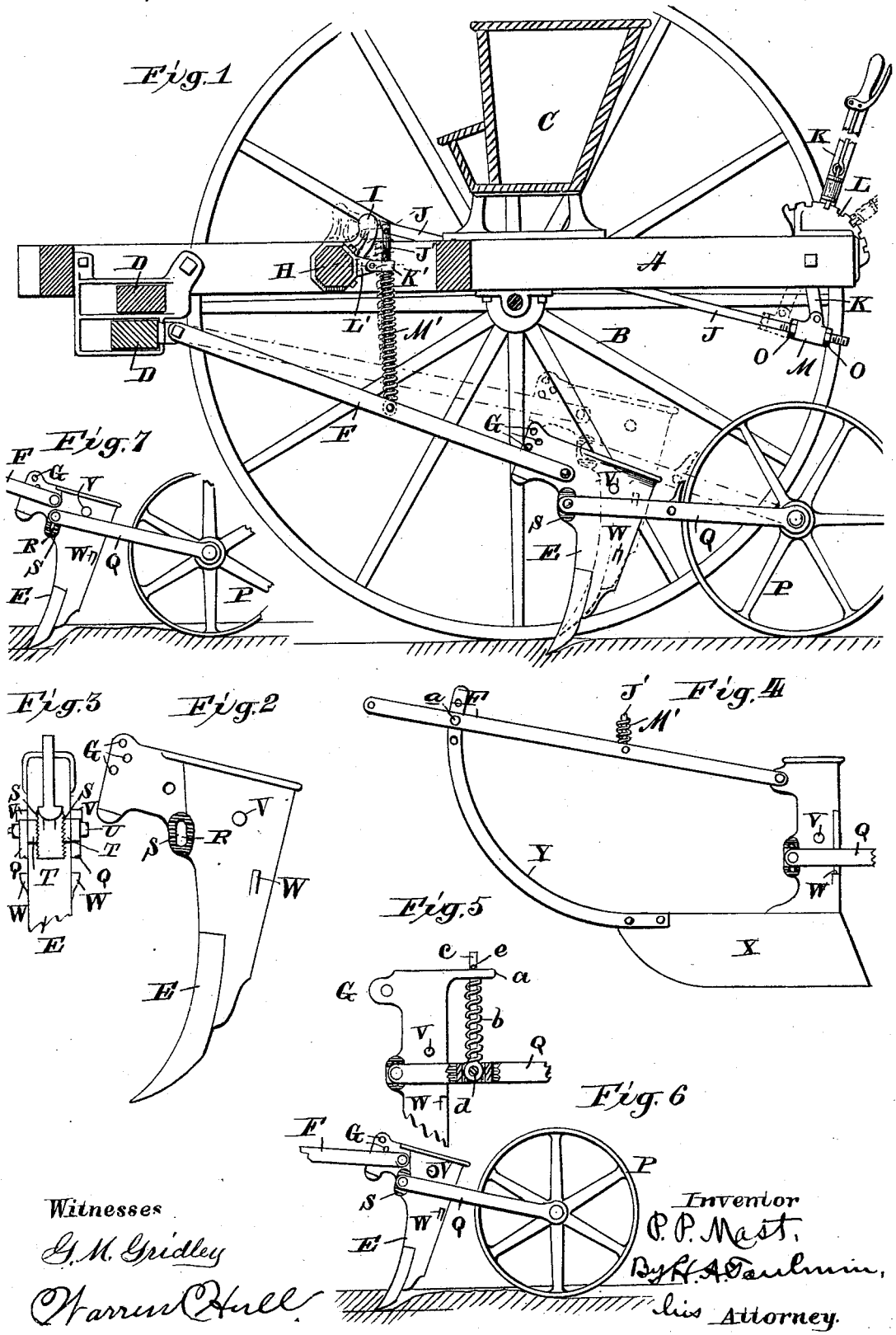

PHINEAS P. MAST, OF SPRINGFIELD, OHIO, ASSIGNOR TO THE P. P. MAST & COMPANY, OF SAME PLACE.

GRAIN-DRILL.

SPECIFICATION forming part of Letters Patent No. 404,853, dated June 11, 1889.

Application filed February 16, 1889. Serial No. 300,131. (No model.)

*To all whom it may concern:*

Be it known that I, PHINEAS P. MAST, a citizen of the United States, residing at Springfield, in the county of Clark and State of Ohio, have invented certain new and useful Improvements in Grain-Drills, of which the following is a specification, reference being had therein to the accompanying drawings.

This invention relates to certain new and useful improvements in grain-drills; and the object of the invention is to render this class of implements more useful in planting grain in soil where the climatic conditions expose the soil to violent sweeping tempests or wind storms, amounting at times to hurricanes, which blow and upturn the soil to such an extent as to expose the grain and completely unplant it when drilled at ordinary depths and covered in the usual ways. The soil where some of these climatic conditions exist is of a light sandy nature, rendering it easily disturbed and scattered by these winds. I have in view the drilling of the soil to a greater depth than usual and planting the grain at such increased depth and packing the soil down firmly.

With these ends in view my invention consists of combinations, arrangements, and structural features, hereinafter more fully described, and pointed out in the claims.

In the accompanying drawings, forming a part of this specification, and on which like reference-letters indicate corresponding parts, Figure 1 represents a partial section and side elevation of a grain-drill with some of its features removed, but showing my improvements applied thereto; Fig. 2, a detail sectional view of one of the hoes with the structural features of my invention thereon; Fig. 3, a front elevation of the upper portion of the hoe; Fig. 4, a side elevation of a hoe and a runner with my improvements applied thereto; Fig. 5, a detail partial side view and partial sectional view of a portion of a hoe and the wheel-connecting bars, with a supplemental pressure-spring. Fig. 6 is a detail view of the packing-wheel and hoe and connecting devices, showing the hoe depressed to a medium depth; and Fig. 7, a similar view showing the hoe depressed to an unusual depth.

The letter A designates the frame of any approved grain-drill, preferably of the type manufactured and put on the market by my assignees herein, of Springfield, Ohio, and mounted in the wheels B, (one only of which is shown,) and having the usual grain-box C. The grain-dropping instrumentalities are not illustrated, because they do not enter into the subject of the present invention, and are not necessary to an understanding of the latter. To the forward portion of the frame—as to the adjustable transverse bars D—are secured first one and then the other of the hoes E by the usual bars or beams F. The connection between the hoe and these beams is pivotal, and in either of the holes G of the hoe is fitted the usual fragile or wooden "break-pin," whose function is well known. A rock-shaft H is mounted in the frame A and manipulated through an arm I, a pitman J, and a locking-lever K, whose detent engages with the notched segment-plate L. The connection between the locking-lever K and the pitman J is preferably adjustable through a sleeve M and nuts O on the pitman J. To the bars F is pivotally connected a rod J', whose upper portion slidingly fits a collar K', connected to a short arm L', carried by the rock-shaft H. A spiral spring M' is coiled about this rod and interposed between the bars F and the collar K', so as to exert a strong downward pressure. By these means the hoes may be depressed to different depths in the soil, so as to drill the grain more or less deeply.

The letter P designates the packing-wheel, whose function is to pack the grain and the soil about it firmly down in the furrow made by the hoe-point, and whose further function is to limit the descent of the hoe when undergoing great depressing force from the depressing-spring before alluded to, so that while the hoe is thus depressed well into the ground and held therein its point is not pressing downward upon the soil, but is simply planted to a given depth, limited by the supporting action of the wheel P through the intermediate devices about to be described, and held down by the depressing-spring. These devices consist of connecting-bars Q, mounted on the wheel-spindle, and pivotally and adjustably connected at their free ends to the hoe, one at either side. The hoe is slotted, as seen in Fig. 2 at R, and has a serrated surface S about said slot, with which to interlock the serrated washers T, interposed between the bars Q and the surfaces S. These parts are secured by a bolt U, passing through the slot R. The bars may be adjusted up and down by loosening the nut on the bolt and changing the position of the washers T on the surfaces S for the purpose of locking the bars Q more or less near the depressing-studs V, cast on or otherwise connected with the shoe. The shoe is further provided with lifting-lugs W, whose function is to engage the under edges of the bars Q and lift the wheel P from the ground for convenience in turning around and removing the machine from place to place while not in operation.

In Fig. 1 I have illustrated the hoe and wheel as resting on practically the surface. In Fig. 6 I have illustrated the hoe as depressed to a medium depth and the wheel packing the soil and grain by its weight and that of the bars Q. In Fig. 7 I have illustrated the hoe as depressed to an unusual depth and the wheel to a corresponding depth, with the lugs V forcibly engaging with the bars Q, so as to transfer the depressing force of the depressing-spring through the hoe to the wheel, and so as to limit the descent of the hoe, as already alluded to. It will be observed that the bars Q are adjusted lower down with respect to the slot R in Fig. 6 than in Fig. 7. The higher this adjustment the sooner the bars will arrest the hoe in its descent, and therefore, by means of this adjustment, the positive downward limit of the hoe may be varied to suit particular circumstances.

Machines constructed according to this invention have gone into practical use, and are found to work with entire satisfaction, planting the grain at a safe depth, and packing it and the soil well and firmly down, and fully complying with the necessities of the soil and climatic conditions hereinbefore alluded to.

In Fig. 4 I have illustrated the hoe constructed with a runner X, adjustably connected by a curved bar Y with the bar or beam F. In Fig. 5 I have illustrated a slight modification in the connection between the hoe and the connecting-bars Q by interposing between a projection $a$ on the hoe and the bars Q a spiral spring $b$, wound upon a rod $c$, pivoted on a pin $d$, secured to the bars Q, and working through an opening in the projection $a$, and having a pin $e$ to insure it from becoming disengaged from the projection. These devices afford a spring-connection between the hoe and the covering-wheel P, which causes the wheel to be depressed with more or less force in addition to its gravity before the lugs V reach the bars Q.

The adjustability between the bar or beam F and the curved bar Y is to admit of changing the inclination of the runner X to run more or less deeply into the soil. This adjustment is effected by means of the series of holes seen in the upper end of the bar Y, and the pin $a$, which fits said openings, and an opening in the bar F.

I claim—

1. In a grain-drill, the combination, with a hoe connected to the frame and devices to depress the hoe into the ground, of a grain and soil packing wheel, and its connecting-bars pivotally attached to the hoe, and a lateral projection on the hoe above and below said bars, the one to transfer the pressure on the hoe to the wheel and the other to lift the wheel with the hoe.

2. In a grain-drill, the combination, with a hoe, the frame, and devices to depress the hoe into the soil, of a grain and soil packing wheel, and its connecting-bars attached to the hoe by a vertically-adjustable pivot, and projections on the hoe near said pivot, and arranged to engage with the wheel-connecting bars when the hoe is adjusted to different depths, according to the adjustment of said pivot.

3. The combination, with a hoe having a substantially vertical slot and serrated surfaces about the slot and a lug or projection in proximity to the said slot, of a soil and grain packing wheel and its connecting-bars, serrated washers engaging said serrated surfaces, and a bolt which passes through said slot and binds said bars, washer, and serrated surfaces together.

4. The combination, with a hoe having a slot substantially in a vertical direction, serrated surfaces about said slot, a projection at each side in proximity to the said slot, and projections below the slot and near the rear edge of the hoe, of a soil and grain covering wheel, its connecting-bars, serrated washers fitted to said surfaces, and a bolt which passes through said slot and binds the bars, washers, and serrated surfaces together, whereby the wheel may be lifted and depressed by lifting and depressing the hoe.

In testimony whereof I affix my signature in presence of two witnesses.

PHINEAS P. MAST.

Witnesses:
C. C. KIRKPATRICK,
H. STILLMAN FOLGER.